(12) United States Patent
Gao et al.

(10) Patent No.: US 7,602,985 B2
(45) Date of Patent: Oct. 13, 2009

(54) MULTI-SCALE ENVELOPING SPECTROGRAM SIGNAL PROCESSING FOR CONDITION MONITORING AND THE LIKE

(75) Inventors: Robert X. Gao, Amherst, MA (US); Ruqiang Yan, Amherst, MA (US)

(73) Assignee: University of Massachusetts, Boston, MA (US)

( * ) Notice: Subject to any disclaimer, the term of this patent is extended or adjusted under 35 U.S.C. 154(b) by 177 days.

(21) Appl. No.: 11/521,090

(22) Filed: Sep. 14, 2006

(65) Prior Publication Data

US 2009/0222228 A1     Sep. 3, 2009

Related U.S. Application Data

(60) Provisional application No. 60/716,811, filed on Sep. 14, 2005, provisional application No. 60/717,175, filed on Sep. 15, 2005.

(51) Int. Cl.
*G06K 9/36* (2006.01)
*B24B 49/00* (2006.01)

(52) U.S. Cl. .......................................... 382/240; 451/8

(58) Field of Classification Search ................. 382/232, 382/240; 451/8; 702/194; 73/777, 826
See application file for complete search history.

(56) References Cited

U.S. PATENT DOCUMENTS 6,602,109 B1 *  8/2003  Malkin et al. .................. 451/8

6,862,558 B2 *  3/2005  Huang ......................... 702/194
2004/0120592 A1  6/2004  Fernandes

OTHER PUBLICATIONS

Zhang et al. ("Wavelet-Based Enveloping for Spindle Health Diagnosis", Instrumentation and Measurement Technology Conference 2005 (IMTC 2005), Proceedings of IEEE vol. 2, Published on May 16-19, 2005, pp. 1203-1208), entire of document.

* cited by examiner

*Primary Examiner*—Duy M Dang
(74) *Attorney, Agent, or Firm*—Reinhart Boerner Van Deuren s.c.

(57) ABSTRACT

A signal processing technique that decomposes complex, dynamically changing non-stationary signals from machine components such as bearings into different scales by means of a continuous wavelet transform. The envelope signal in each scale is then calculated from the modulus of the wavelet coefficients. Subsequently, Fourier transform is performed repetitively on the envelope of the signal at each scale, resulting in an "envelope spectrum" of the original signal at the various scales. The final output is a three-dimensional scale-frequency map that indicates the intensity and location of the defect-related frequency lines. The technique is generic in nature, and applicable not only to machine condition monitoring, but also to the health monitoring of a wide range of dynamic systems, including human beings.

23 Claims, 9 Drawing Sheets

Running-in Stage

Normal Wear Stage

Ultimate Wear Stage (A) Test Condition 1: speed: 1,200 rpm; radial load: 3,665 N (B) Test Condition 2: speed: 900 rpm; radial load: 3,665 N (C) Test Condition 3: speed: 1,800 rpm; radial load: 3,665 N (D) Test Condition 4: speed: 1,200 rpm; radial load: 1,833 N (E) Test Condition 5: speed: 1,200 rpm; radial load: 4,582 N (A) A test signal with it's Fourier spectrum (SNR=-12dB)

(B) Test signal analysis using conventional enveloping with band-pass filtering (B) Test signal analysis using multi-scale enveloping spectrogram technique

MULTI-SCALE ENVELOPING SPECTROGRAM SIGNAL PROCESSING FOR CONDITION MONITORING AND THE LIKE

This application claims the benefit of U.S. Provisional Patent Application No. 60/716,811, filed on Sep. 14, 2005, and U.S. Provisional Patent Application No. 60/717,175 filed on Sep. 15, 2005.

STATEMENT REGARDING FEDERALLY SPONSORED RESEARCH

The United States government has certain rights to this invention pursuant to Grant No. DMII-0218161 from the National Science Foundation to University of Massachusetts.

BACKGROUND OF THE INVENTION

Field of the Invention

The present invention relates generally to signal processing techniques, and more particularly, to a multi-domain signal processing technique that integrates the wavelet transform, spectral analysis and color mapping into a new technique, which provides enhanced feature extraction capability from dynamically changing signals.

Increasing complexity of machine systems requires an increasing deployment of sensors for comprehensive, accurate, and timely gathering of data that are characteristic of a machine's operating condition. Effective utilization of sensor data depends on the effectiveness and efficiency of the applied signal processing technique that extracts characteristic features from the signal to evaluate judgment on how severe the defect in the machine system is, and what needs to be done to correct the problem and ensure continuous, safe operation. Of the various signals commonly used for condition monitoring and health diagnosis of rotary machines and machine components (e.g. bearings, spindles, gearboxes), vibration signals have been widely used, as they contain rich physical information directly related to the dynamics of the machine being monitored. Proper analysis of such signals is a critical prerequisite for accurate identification of hidden defects within the machine that may cause potential machine failure, timely diagnosis of the severity of the defect, and reliable prediction of the remaining service life of the machine, based on the trending analysis of the defect development. It further establishes the basis for automated and condition-based flexible maintenance scheduling, as opposed to the traditional, fixed-interval maintenance, to minimize machine downtime, improve productivity, while reducing the maintenance cost.

Time domain signal analysis techniques have been investigated for the last several decades. Statistic parameters such as peak values, root mean square [Reference 1], kurtosis [Reference 2], and crest factor [Reference 3] of vibration signals have been used to characterize machine defect severity. It was found that time-domain signals analysis is generally vulnerable to structural vibration contamination and environmental noise. In comparison, frequency domain analysis techniques based on the Fourier transform require that the signal to be analyzed has a dominant frequency band, and a priori knowledge of the band location is needed [Reference 4]. Due to these difficulties, detecting machine structural defects at their incipient stage when the related signals are generally weak and without a distinctive spectrum poses a challenge to conventional spectral analysis techniques. Several modified spectral techniques have been introduced to overcome the above described difficulty, such as Short Time Fourier Transform (STFT) and Repetitive Fourier Transform (RFT) [Reference 5]. Out of the location of defect-related frequency lines, the size of the analysis windows will be determined. In practice, such determination is satisfied only through a trial-and-error process.

To overcome this limitation, the wavelet transform has been increasingly investigated [References 6, 7]. Unlike the Fourier transform, which expresses a signal as the sum of a series of single-frequency sine and cosine functions, the wavelet transform decomposes a signal onto a set of basis functions, which are obtained from a single mother wavelet by scaling (dilation/contraction) and time shift (translation), to measure the "similarity" between the signal and the mother wavelet. Through variations of the scales and time shifts of the wavelet function, the wavelet transform is capable of extracting signal features over the entire spectrum, without requiring the signal having a dominant frequency band. On the other hand, because of its nature as a time-scale domain technique, wavelet transformation does not provide or make use of the frequency characteristics of the signal, which are inherently embedded in the signal, due to the periodical nature of the signal generation (e.g. balls rolling over a raceway crack as a bearing rotates).

Complementing the wavelet transform with frequency information related to the defect characteristics would significantly enhance the effectiveness of defect signal extraction. A multi-domain signal feature extraction technique developed by Robert X. Gao, et al. [Reference 8] first performs a wavelet transform of a vibration signal measured on a machine. The values of the resulting wavelet coefficients corresponding to each wavelet decomposition scale indicate the level of similarity between the wavelet and the vibration signal being analyzed. Subsequent spectral analysis of the wavelet coefficients reveals the frequency content of the features hidden in the signal [Reference 8]. Such an approach has shown to be more effective than the traditional Fourier transform or wavelet transform applied alone.

Bearing defect detection, severity assessment, and remaining service life prediction have been major research topics for the past decades. Of the various types of parameters considered indicative of defective bearing operations, vibration has been widely investigated, as it directly reflects upon the dynamics of the bearing structure, and hence serves as an effective indicator of potential bearing failures.

Every time when rolling elements (balls or rollers) in a bearing roll over a structural defect (e.g. crack or spalling) on the surface of bearing raceways (inner or outer), a series of impacts will be generated due to the interactions between the two objects. Traditionally spectral analysis based on Fourier Transform, while able to identify the Defect Characteristic Frequency (DCF) caused by the repetitive impacts, faces difficulty when noise contamination and interference from mechanically coupled structures compromise the signal-to-noise ratio. Experiments have confirmed such difficulty, especially at the defect incipient stage when defect-induced signals are weak in amplitude and short in duration.

Comparing to STFT or RFT where predetermined, fixed time interval is used for signal analysis (which leads to fixed time-frequency resolution), the wavelet transform enables flexible time-frequency resolution through its scaling operations.

REFERENCES

The following background information, together with other aspects of the prior art, including those teachings useful in light of the present invention, are disclosed more fully and better understood in light of the following references, each of which is incorporated herein in its entirety.
1. N. Tandon, "Comparison of some vibration parameters for the condition monitoring of rolling element bearings", *Journal of the International Measurement Confederation*, 12(3) (1994), pages 285-289.
2. D. Dyer and R. Stewart, "Detection of rolling element bearing damage by statistical vibration analysis", *ASME Journal of Mechanical Design*, 100 (1978), pages 229-235.
3. R. Heng and M. Nor, "Statistical analysis of sound and vibration signals for monitoring rolling element bearing condition", *Applied Acoustics*, 53(1-3) (1998), pages 211-226.
4. Mafadden, P. and Smith, J., "Vibration monitoring of rolling element bearings by the high frequency resonance technique—a review", *International Tribology*, 17(1) (1984), pages 3-10.
5. Mol, H. A. and Van Nijen, G. C., "Method for analyzing regularly recurring mechanical vibrations", U.S. Pat. No. 5,698,788.
6. K. Mori, N. Kasashima, T. Yoshioka, and Y. Ueno, "Prediction of spalling on a ball bearing by applying the discrete wavelet transform to vibration signals", *Wear*, 195(1-2) (1996), pages 162-168.
7. W. J. Wang and P. D. McFadden, "Application of wavelets to gearbox vibration signals for fault detection", *Journal of Sound and Vibration*, 192(5) (1996), pages 927-939.
8. C. Wang and R. Gao, "Wavelet transform with spectral post-processing for enhanced feature extraction", *IEEE Transactions on Instrumentation and Measurement*, 52 (4) (2003), pages 1296-1301.
9. Hahn, S. L., 1996, *Hilbert Transform in Signal Processing*, Artech House, Inc., Norwood, Mass.
10. Mallat, S. G., 1999, *A Wavelet Tour of Signal Processing*, Academic Press.

SUMMARY OF THE INVENTION

The disadvantages and limitations of the background art discussed above are overcome by the present invention. With this invention, there is provided a novel, multi-domain signal processing technique, referred to herein as the Multi-Scale Enveloping Spectrogram (MuSEnS) signal processing technique. The signal processing technique integrates the wavelet transform, spectral analysis, and color mapping techniques into one new entity by performing Fourier transform on wavelet coefficient modulus of a system monitoring signal (e.g., a vibration signal) at various scales, resulting in a three-dimensional scale-frequency map that indicates the intensity and location of defect-induced frequency lines. The time information related to the defect feature is provided by the time-frequency separation step as an intermediate result of the calculation procedure. Compared to prior art techniques, such a multi-domain signal decomposition method is more accurate and illustrative in depicting critical features related to the defect embedded in a machine.

This multi-domain signal processing technique combines the advantages of the wavelet transform (in flexible time-frequency signal representation), Fourier-based spectral analysis (in indicating the intensity and location of defect-induced characteristic frequency lines), and color mapping (in differentiating various parameters through a user-friendly interface) into one integrated approach, that enables more effective defect detection.

Comparing to Short Time Fourier Transform (STFT) or Repetitive Fourier Transform (RFT), which represent the major comparative techniques previously developed, this invention has overcome the common deficiency and limitation caused by a predetermined, fixed time interval in the signal decomposition (which leads to fixed time-frequency resolution) through introducing an adaptive time-frequency resolution. This is achieved by means of the scaling operation associated with the wavelet transform, which is part of the MuSEnS technique. As a result, the new technique of the present invention is more effective in extracting defect-related features from a signal being monitored, e.g., vibration signals, as experimentally verified.

Signal processing has been widely applied in all fields of industrial and commercial applications for machine condition monitoring and health diagnosis. The MuSEnS method of the present invention may be integrated into existing or future scientific computing or data acquisition software packages (such as MatLab or LabView) for use by researchers and engineers. It can also be coded as a stand-alone software package for use, e.g., on a factory-floor by machine operators, e.g., to monitor the operation condition of a machine tool in an on-line, real-time fashion.

Manufacturers of rotating machines and machine components, as well as bearing and spindle end users, e.g., paper and pulp, printing, engine and turbine, and automobile manufacturers will be able to take advantage of the new signal processing technology of the present invention, because it provides a new tool that can be used to more accurately analyze the current condition of a machine and/or machine component (e.g., bearings, spindles, etc.) during its operation. Such kind of information has not been widely available to such users, due to the deficiencies and limitations generally associated with the present technology.

The potential applicability and value of the present invention, however, goes well beyond the industries just listed. In modern manufacturing, because of the large amount of materials being processed per time unit, unplanned machine stoppage due to machine failures may result in huge economic losses. For the transportation industry, reliable and safe operation of vehicles (e.g. trains and airplanes) is critical to retaining the value of transported goods, avoiding disruptions of logistic scheduling, and ensuring safety for millions of passengers. Through integration into a machine condition monitoring and health diagnosis system, the signal processing techniques provided by the present invention can significantly improve effectiveness in error detection and prediction, providing early-warning capability against potential machine failures. Such capability will be of value to a wide range of industrial, commercial, and defense applications.

Another area of applications where the invented technique may have significant potential impact is health care for humans. By integrating the enhanced feature extraction capability of the MuSEnS technique with sensors, e.g. for blood pressure, heart beat, or oxygence content measurement, real-time, remote, and portable human health monitoring can be realized, which will contribute to improving the state-of-the-art of preventative medicine and patient care.

DESCRIPTION OF THE DRAWINGS

These and other advantages of the present invention are best understood with reference to the drawings, in which.

DETAILED DESCRIPTION OF THE PREFERRED EMBODIMENT

The novel wavelet-based signal decomposition technique, Multi-Scale Enveloping Spectrogram (MuSEnS), provided by the present invention combines the advantages of wavelet transform, spectral analysis, and color mapping techniques for more effective feature extraction from complex, dynamically changing signals, for defect detection, health diagnosis and prognosis in machines and/or human being.

Figure 1:
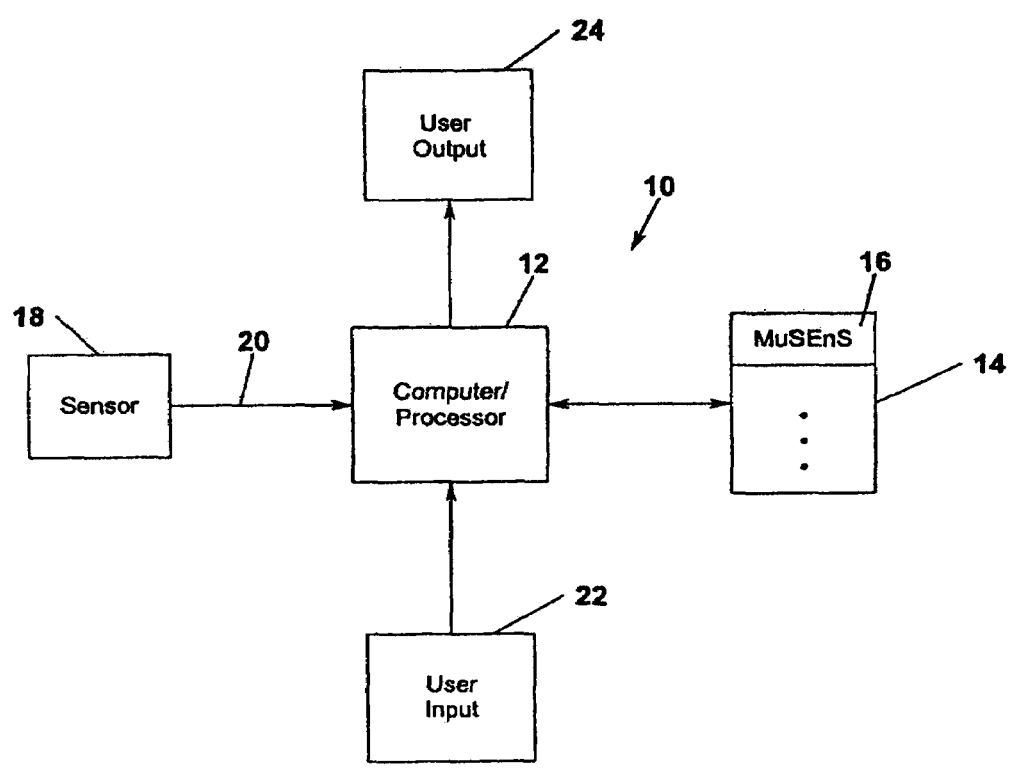
FIG. 1 is a schematic block diagram of an exemplary computer processor based system for implementing a Multi-Scale Enveloping Spectrogram technique in accordance with the present invention.

The present invention may be implemented as a software process executed in a computer processor based system 10 as illustrated, for example, in FIG. 1. The computer processor 12 that is used to execute a multi-scale enveloping spectrogram processes in accordance with the present invention may be any conventional currently known or future programmable processor. The computer processor 12 may thus be that of a stand-alone general purpose computer or a microprocessor or similar device embedded, for example, in a dedicated process control or monitoring device. In any case, memory 14 associated with the computer processor 12 includes program code 16 accessable by the computer processor 12 for implanting the functionality of a multi-scale enveloping spectrogram process in accordance with the present invention. The memory 14, which may be separate from or an integral part of the computer processor 12, may also contain other program code, such as conventional operating system software, and the like, as needed for the general operation of the computer 12.

As will be discussed in more detail below, a signal processing technique in accordance with the present invention is used to process signals obtained from physical phenomena to monitor operation of an underlying system. The signal or signals to be monitored are obtained using one or more sensors 18 and provided to the computer processor for processing in accordance with the present invention. The signals to be processed may be provided from the sensor 18 to the computer processor 12 via any conventional known or future wired or wireless connection 20. Appropriate analog-to-digital conversion of the sensor signal for use by the computer processor 12 may be provided in any appropriate manner, e.g., by an appropriate converter located at the sensor 18, implemented in the computer processor 12, or provided anywhere along the connection 20 provided therebetween.

The type of sensor 18 that is employed will depend upon the nature of the underlying system to be monitored. For example, conventional vibration sensors may be used for the monitoring of machine system operation. Similarly, electrical, acoustical, optical, or other sensors may be used for such applications. For the monitoring of a physiological system using the techniques of the present invention appropriate physiological signal sensors (e.g., ECG, EKG, EMG, etc.) may be employed.

A computer implemented system 10 in accordance with the present invention preferably also includes appropriate user input 22 and output 24 devices. Such devices may be implemented using conventional computer peripheral devices, such as a keyboard, mouse, monitor, printer, etc., and may be connected via wired or wireless connection to the computer processor 12. Such input 22 and output 24 devices allow an operator to interact with a system 10 implementing signal processing in accordance with the present invention and to monitor the results of such processing.

Based on the detailed description, process illustrations, and exemplary output provided herein a person of ordinary skill in the art of program development for signal processing will be able to implement a system in accordance with the present invention on conventional known and future hardware systems using known and appropriate programming languages and techniques.

For purposes of illustration of the invention, the MuSEnS signal processing technique will be described herein with reference to an application for detecting localized defects in rolling bearings. However, this signal processing technique is not limited to applications for bearing condition monitoring and defect diagnosis, for example. The MuSEnS signal processing technique can be employed in a wide variety of monitoring and control applications, and can be considered as an integral part of such larger monitoring and control system, which can be include applications to machines, human beings, or anything that generates a signal. For example, the MuSEnS technique can be used in the health care industry for humans. By integrating the enhanced feature extraction capability of the MuSEnS technique with condition monitoring sensors, such as monitoring sensors for blood pressure, heart beat, or oxygen content measurement, for example, real-time, remote, and portable human health monitoring can be realized.

The processing technique of the present invention integrates the wavelet transform, spectral analysis, and color mapping techniques into one entity by performing Fourier transform on wavelet coefficient modulus of the vibration signal at various scales, resulting in a three-dimensional scale-frequency map that indicates the intensity and location of the defect-induced frequency lines. The time information related to the defect feature is provided by the time-frequency separation step as an intermediate result of the calculation procedure. Compared to the prior art, such a multi-domain signal decomposition method is more accurate and illustrative in depicting critical features related to the defect embedded in a machine.

Figure 2:
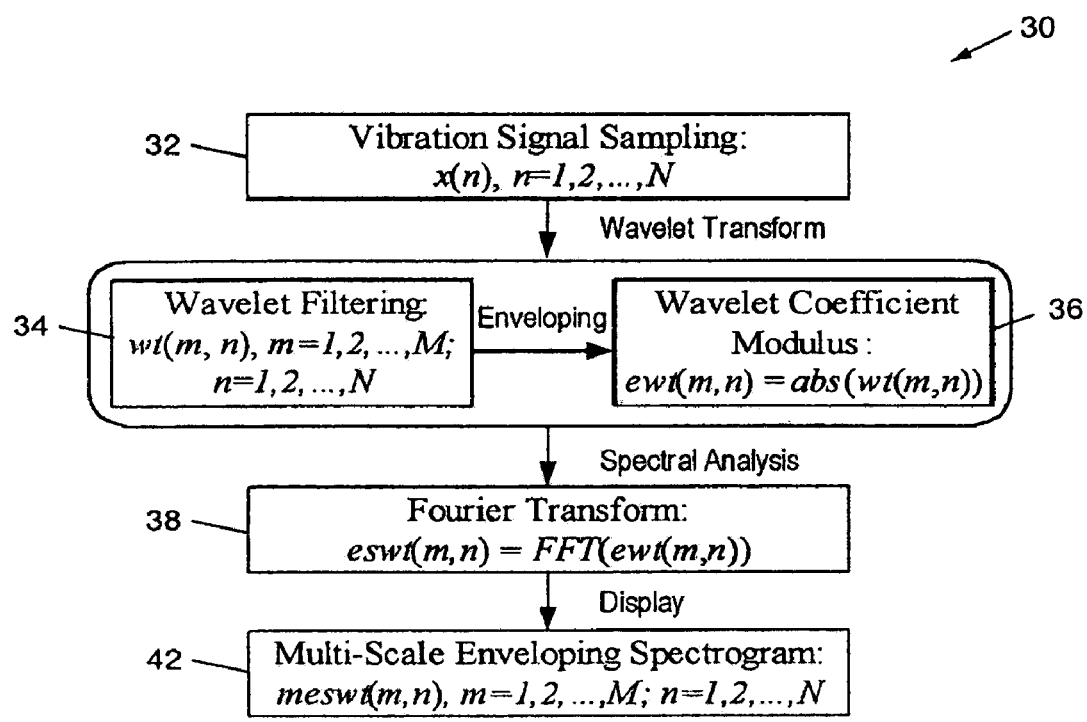
FIG. 2 is a flow chart of an exemplary Multi-Scale Enveloping Spectrogram technique provided by the present invention.
Figure 3:
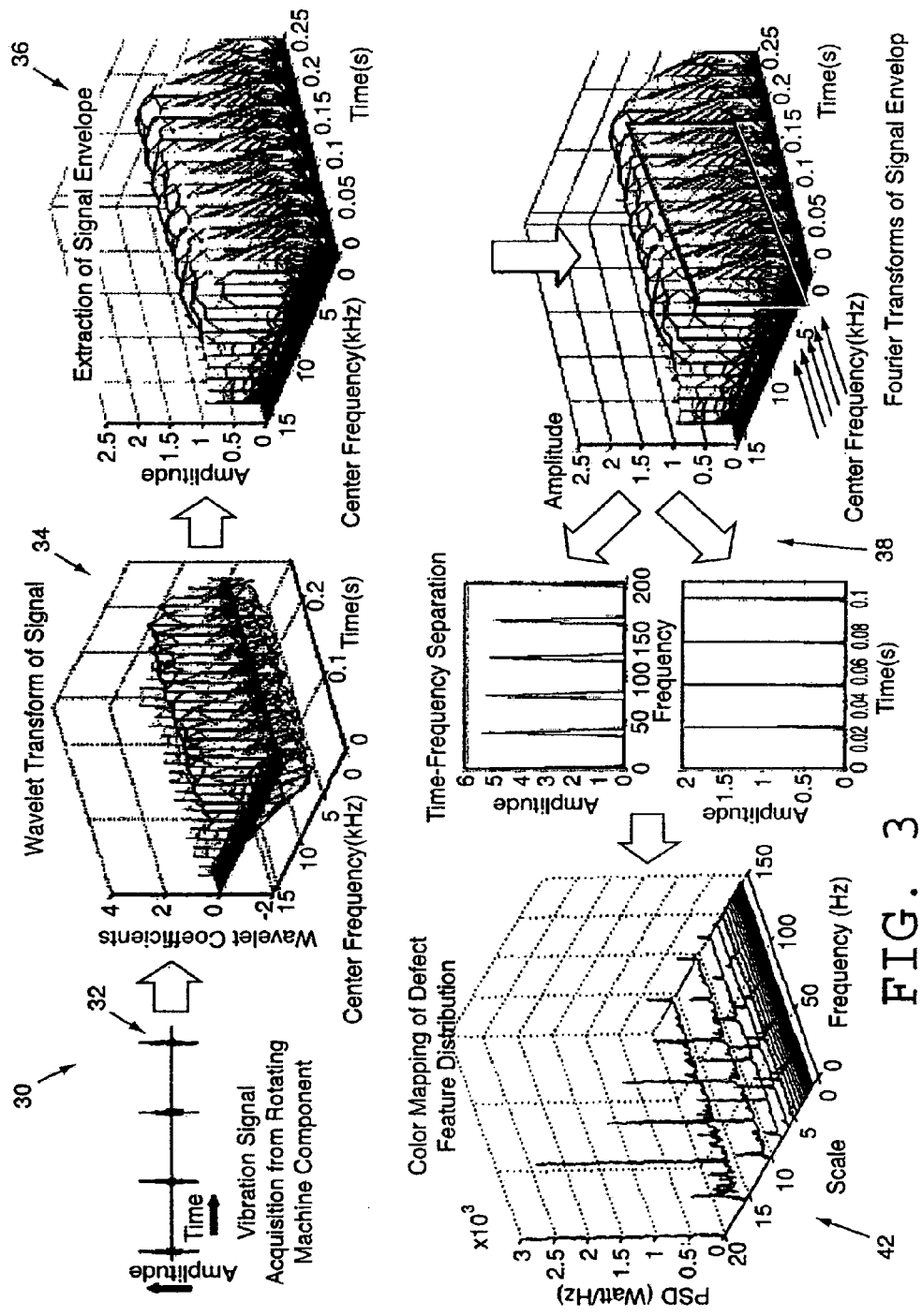
FIG. 3 illustrates graphically major steps involved in an exemplary Multi-Scale Enveloping Spectrogram technique provided by the present invention.

The major computational steps involved in the MuSEnS technique 30 are illustrated in the flow chart diagram of FIG. 2 and graphically illustrated in FIG. 3. The steps include signal acquisition 32, e.g., signal acquisition from a rotating machine component; wavelet transformation 34 of the signal; extraction of the signal envelope 36; Fourier transforms of the signal envelope 38 providing time-frequency separation 40; and generation 42 of a multi-scale enveloping spectrogram or color mapping 42 of the result from which defects or other phenomena may be easily detected.

This is a multi-domain signal processing technique that combines the advantages of the wavelet transform (in flexible time-frequency signal representation), Fourier-based spectral analysis (in indicating the intensity and location of defect-induced characteristic frequency lines), and color mapping (in differentiating various parameters through a user-friendly interface) into one integrated approach, that enables more effective defect detection, health diagnosis and remaining service life prognosis in machines or other types of dynamic systems.

Methodology

Figure 4:
FIG. 4 shows exemplary vibration signals of a gearbox at various states of wear.
Figure 4:
Figure 4:
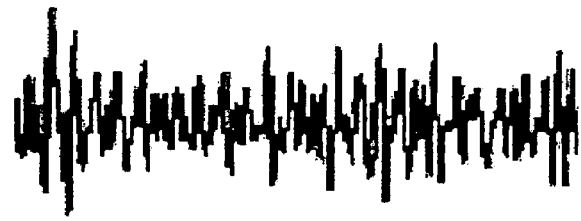
Figure 5:
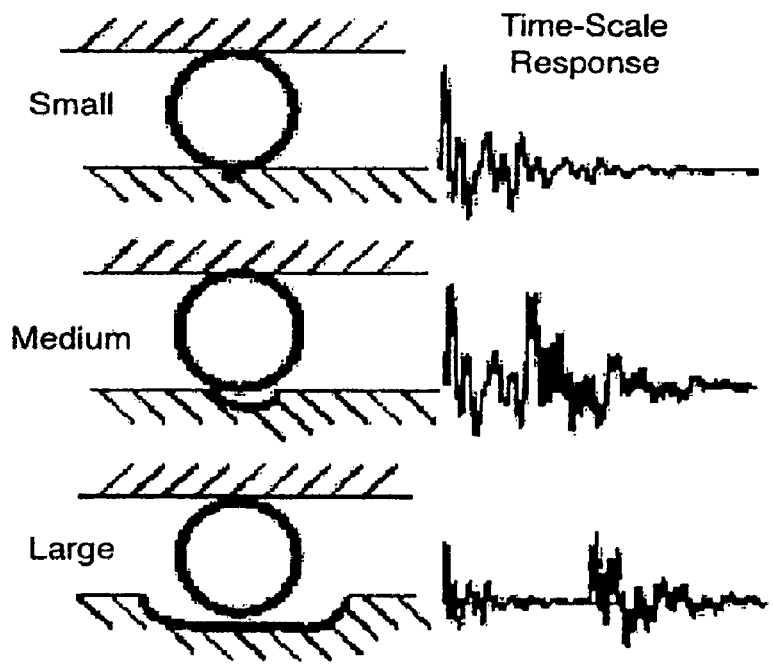
FIG. 5 is a graphical representation of a bearing in a motor with various defect sizes.

The series of steps for implementing the MuSEnS technique in accordance with the present invention will now be described in more detail with reference to a non-limiting application for detecting localized defects in rolling bearings. FIG. 4 shows exemplary vibration signals of a gear box at various states of wear. Such are the signals that may be sampled 32 for analysis by a technique in accordance with the present invention. FIG. 5 shows corresponding representational illustrations of a bearing in a motor with various defect sizes. Localized defects in the bearing are detected by analyzing the vibration signals obtained by monitoring the bearing while the motor is being operated. The signal monitoring can be provided in any known suitable manner. As indicated above, while the MuSEnS signal processing technique is described with reference to an application for detecting and/or monitoring defects in rolling bearings, the signals being analyzed can be produced by any other machine or device capable of generating a signal, or by condition monitoring sensors, such as monitoring sensors for blood pressure, heart beat, or oxygence content measurement, for example, or anything that generates a signal.

The MuSEnS signal processing technique decomposes vibration signals measured on rolling bearings into different scales by means of a continuous wavelet transform (CWT) 34. The envelope signal in each scale is then calculated 36 from the modulus of the wavelet coefficients. Subsequently, Fourier transform 38 is performed repetitively on the envelope of the signal at each scale, resulting in an "envelope spectrum" of the original signal at the various scales. The final output is a three-dimensional scale-frequency map 42 that indicates the intensity and location of the defect-related frequency lines.

Figure 6:
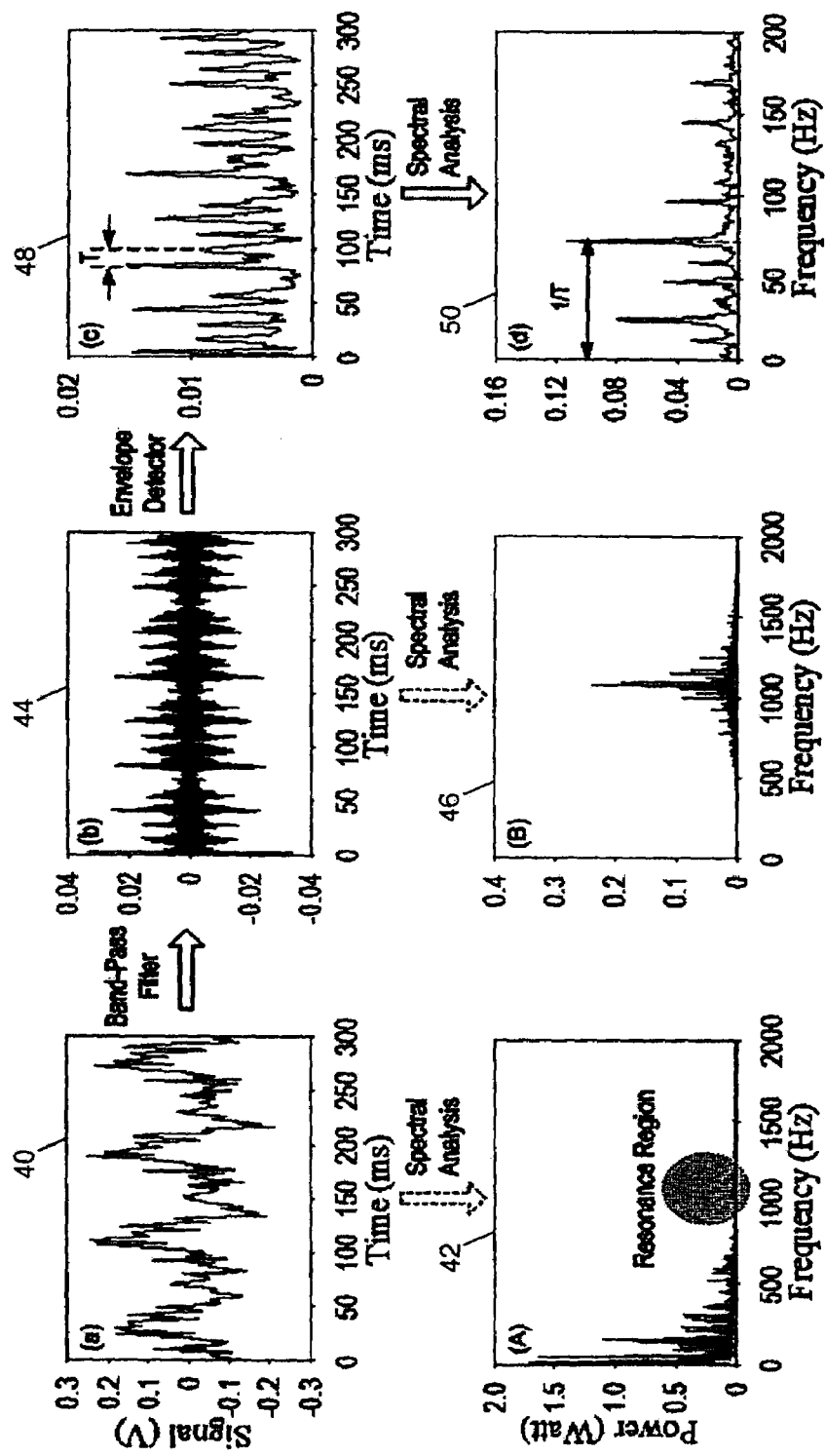
FIG. 6 illustrates a procedure for enveloping spectral analysis in accordance with the invention.

For the specific example of localized bearing defects detection, spectral analysis of the signal's envelope has been widely employed [Reference 4]. This is based on the consideration that structural impacts induced by the localized defect often excite one or more resonance modes of the structure, which are amplitude-modulated by the DCF. Frequencies related to such resonance modes are often located in higher frequency regions than those caused by vibrations from other structural components, and are characterized by energy concentration within a relatively narrow band centered at one of the harmonics of the resonance frequency, as illustrated at 40 and 42 of FIG. 6. By utilizing such mechanical amplification provided by structural resonances, defect-induced vibrations can be separated from background noise and interference, 44 and 46 of FIG. 6. A subsequent demodulation operation is used to extract the corresponding envelope of the defect-induced vibrations, 48 of FIG. 6. Finally, Fourier transform is performed on the envelope signal to identify the repetitive occurrence of the DCF component, which is characteristic of the existence of localized structural defect, 50 of FIG. 6.

In accordance with the present invention, vibration (or other) signals 32 measured, e.g., on a machine or other system being monitored, are first processed 34 using the continuous wavelet transform at different scales. This process can be considered as a series of filtering operations with different center frequencies and bandwidths, to decompose the original signal into corresponding bands. Next, wavelet coefficient modulus are calculated 36 to extract the signal envelopes. Subsequently, spectral analysis 38 using the Fourier transforms is applied to the extracted envelopes to determine the frequency composition. The final results may preferably be displayed 42 in the form of a colored 3D scale-frequency map, which indicates and identifies the defect related frequency components.

In the exemplary application, vibration signal sampling 32 is carried out for vibration signal acquisition from the rolling bearing. In this case, the defect characteristic frequency is 40 Hz. Three excited resonance frequencies 2460 Hz, 4237 Hz and 6367 Hz are obtained.

Scale selection for the continuous wavelet transform is selected over a range of 1 to 15 at increments of 0.5 in this case. The scale to be selected in any particular application may be determined based on the signal to be analyzed, the underlying system being analyzed and other experiential factors. It is desirable to cover all possible frequency ranges of interest. However, computational load may also need to be considered. For the implementation of a real-time or near real-time system, depending upon the computational resources available, the scale range and increments may be limited as appropriate to those most likely to produce valuable information.

The scale selection is applied to the base wavelet before performing continuous wavelet transform 34 on a signal. The purpose of scale selection is to choose a series of scales, which are used to stretch or contract the base wavelet (e.g. complex Morlet wavelet). The resulting stretched or contracted wavelets can be viewed as variants of the original base wavelet. These variants are then used to correlate with the signal (meaning they are used as if they were individual waveform templates to compare with the signal being analyzed, or being "decomposed"). This operation produces a series of wavelet coefficients, whose values are an indication of the closeness or similarity between the templates and the feature components hidden within the signal. The higher the value is, the better the match between the two will be. Since the template is known mathematically in advance, as they are variants of the chosen base wavelet, one can tell from the matching result what is within the signal. This is what the wavelet transform of a signal does. The present invention makes use of this feature of the wavelet transform, and additionally provides the enveloping operation together with the color mapping as a way of display. The effect of these additional operations significantly enhances the feature extraction capability of the MuSEnS algorithm in accordance with the present invention.

In the present example, the complex Morlet wavelet has been used as the base wavelet for the wavelet transform operation 34. It has been found that for this particular application the complex Morlet transform can best extract energy from the signal being processed. Other base wavelets may be found to be more effective in other applications for processing other signals in other systems being monitored. Thus, it should be understood that other current or future known or discovered base wavelets may be employed for signal processing in accordance with the present invention.

For envelope extraction 36, a root sum square (RSS) is built from the real and imaginary parts of the wavelet transform.

The RSS is the actual envelope of the signal decomposed under different scales and subsequent FFT operation is performed on the RSS. The real and imaginary components are obtained during the wavelet process. As is stated above, a complex wavelet is chosen as the base wavelet.

Spectral analysis 38 of the enveloped signal is conducted for every given scale by using Fourier transforms, providing time-frequency separation. Scales are used to stretch and contract the base wavelet. Each scaled base wavelet covers a certain frequency range. Scale operation occurs after a signal has been sampled during the data sampling operation.

The results for all scales are combined and plotted 42 on a three-dimensional scale-frequency-amplitude map with the results being displayed using color mapping of the defect frequency. The intensity and location of defect-induced frequencies are indicated on the map. This may be accomplished by preestablished or user adjustable threshold levels that are used to select the colors for displaying on the map. For example, portions of the processed signals over a certain defined threshold level may be displayed in red, portions of the processed signal below this first threshold, but above a second, lower, threshold, may be displayed in yellow, etc. Such an output may be generated and displayed in real-time, or near real-time, thereby allowing an operator easily to monitor a system and to rapidly determine the presence of defects or other conditions of interest at their earliest appearing.

In additions to, or in lieu of, the map display described, the output of the Fourier transform 38 step may be analyzed, e.g., in the computer processor 12, to detect the occurrence of thresholds or signal patterns that are known to indicate certain underlying conditions in the system being monitored. If certain thresholds are exceeded, or patterns detected, an appropriate message may be provided to the system operator. For example, a visual or audible warning may be generated indicating a defect detection. A portion of the map display may be highlighted to indicate a detected pattern. A warning message may be generated and delivered to appropriate personnel indicating, for example, that a pattern has been detected indicating that system maintenance should be scheduled in X hours, etc.

While envelope extraction has been traditionally implemented by rectifying and low-pass filtering the band-pass filtered, defect-induced vibration signals, Hilbert transform has shown to present a good alternative to forming a signal's envelope [Reference 9]. Performing Hilbert transform on a signal leads to the formulation of a corresponding analytic signal, with its real and imaginary parts being the original signal itself and the Hilbert transform of the signal, respectively. The modulus of the analytic signal represents the signal's envelope. Such a technique, however, requires that appropriate filtering bands be chosen upfront to obtain consistent results under varying machine operating conditions, because changes of machine operation conditions will cause different resonance modes to be excited.

Wavelet transform essentially measures the "similarity" between the signal being analyzed and the scaled mother wavelet, thus can be viewed as a band-pass filter that can extract specific information from a time series, e.g. defect-induced vibrations. Since the imaginary part of a complex wavelet [Reference 10] is inherently the Hilbert transform of its real part, the wavelet coefficients of a transformed signal, in which the complex wavelet is used as the mother wavelet, are analytic in nature, and their corresponding modulus forms the signal's envelope. Therefore, a complex wavelet-based signal transformation combines the ability of band-pass filtering with enveloping into one single step. A multi-scale "enveloping spectrogram" of the original signal can then be obtained by performing the Fourier transformation on the wavelet coefficient modulus of the signal at the various scales, resulting in a three-dimensional scale-frequency map that indicates the intensity and location of the defect-induced frequency lines, and improves the consistency of localized bearing defect detection.

Experimental Evaluation

To experimentally evaluate the performance of the invented signal processing technique, several case studies were conducted. The first case study was focused on identifying the existence of a structural defect on the outer raceway of a roller bearing. The bearing was applied a radial load of 3,665 N and rotated under 1,200 rpm. The sampling frequency applied was 25 kHz. Given that the defect induced impact will excite different resonance modes of the bearing assemble under different operating conditions, the selected wavelet decomposition scale needs to ensure adequate frequency coverage of the defect induced vibration regardless of the variations in operation conditions. In this experiment, the scales between 1 and 8 with an increment of 0.2 were applied, covering the frequency range of 1.56 to 12.5 kHz. Such a frequency range purposely excludes components in the low frequency region, where components of strong magnitudes caused by the periodic rolling element rotation around the raceway can "mask" vibrations induced by a structural defect, especially when the defect is in the incipient stage. Such "masking" effect is a key impediment to successful defect identification using any signal processing technique.

Figure 7:
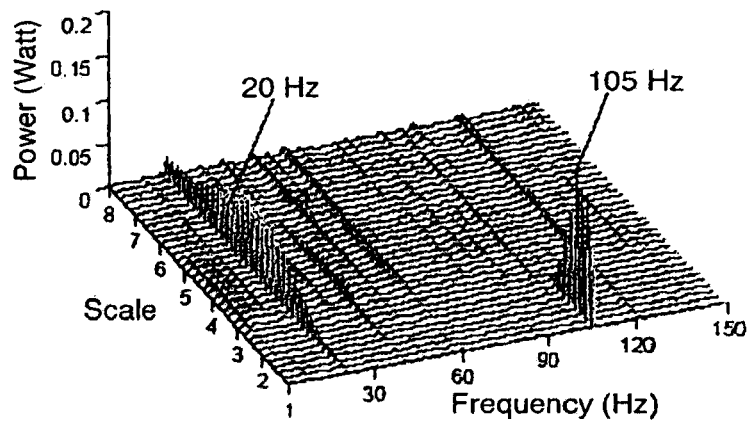
FIG. 7 are exemplary output displays illustrating the effectiveness of the present invention in detecting a structural defect on the outer raceway of a roller bearing, under different rotational speeds and radial loads.
Figure 7:
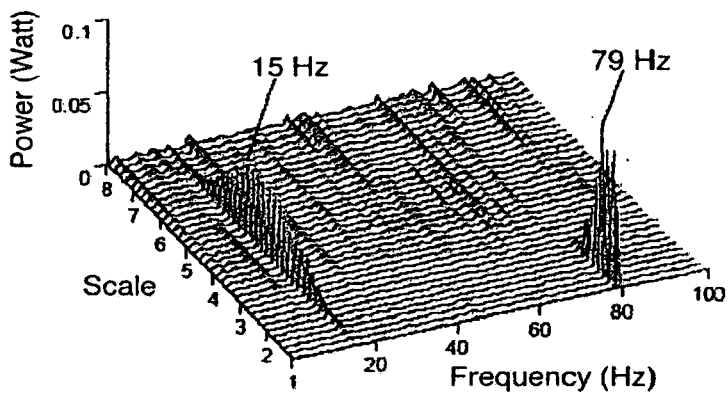
Figure 7:
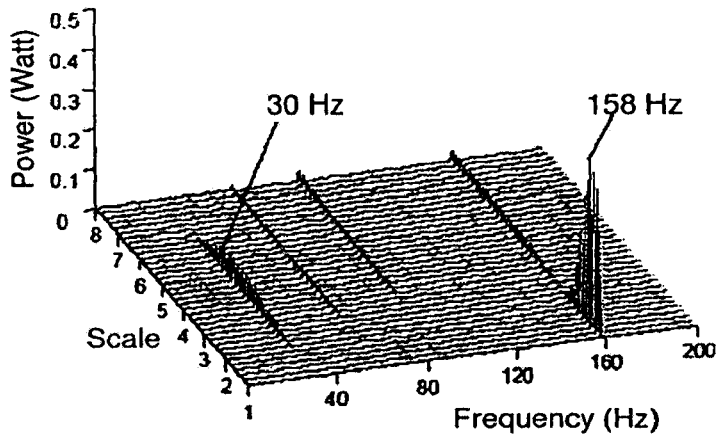
Figure 7:
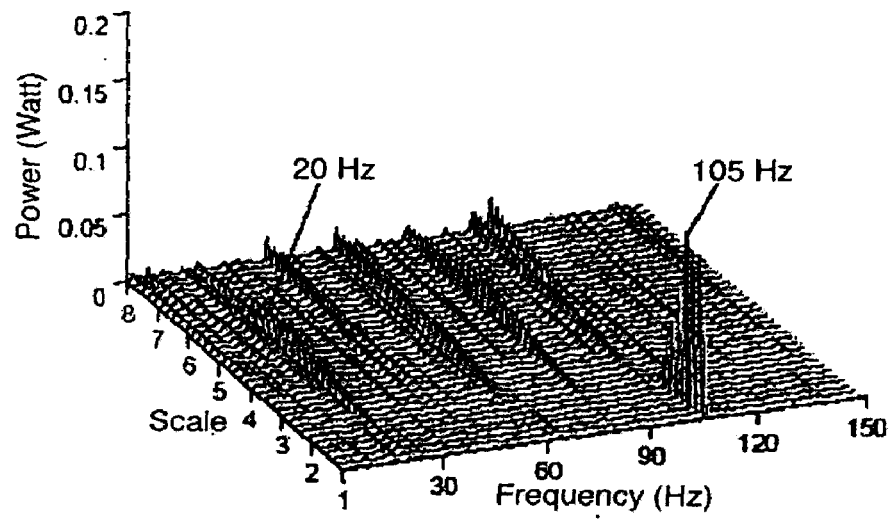
Figure 7:
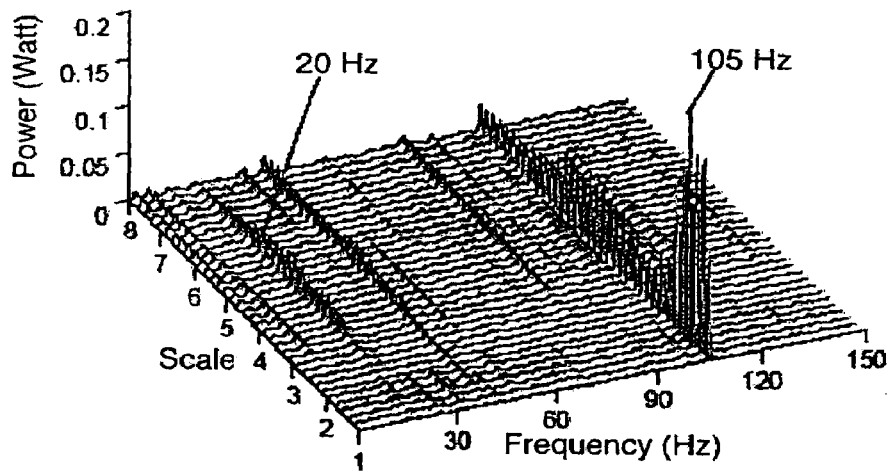

Applying the MuSEnS technique of the present invention, vibration signals measured from the test bearing were analyzed and in FIG. 7A the multi-scale enveloping spectrogram of the vibration signal is illustrated. Two major peaks can be clearly seen at the 20 and 105 Hz locations along the frequency axis, respectively. The spectrogram demonstrates the result of the spectral analysis of the envelope of the wavelet-transformed original signals. The 20 Hz frequency component, existing across all the scales, reflects upon the roller bearing rotation. The 105 Hz component was identified at the scales ranging from 1 to 2.4. This component can be traced back to the repetitive interactions between the rollers and a structural defect. The existence of this frequency component reveals the existence of an outer raceway defect.

To verify the analysis results, another case study was conducted on the same bearing, under different bearing rotating speeds. FIGS. 7B and 7C illustrate the results obtained under 900 and 1,800 rpm, respectively. In addition to the rotational speed-related frequency components (e.g., at 15 Hz and 30 Hz, respectively), the defect related repetition frequency on the outer raceway was once again successfully identified, at 79 Hz and 158 Hz, respectively. The increase of the defect-induced vibration frequency can be explained by the fact that, as the bearing rotational-speed increases, more impacts will be generated within the same period of time. Furthermore, such an increase also leads to an increase of the defect-induced vibration energy. As a result, the magnitude of defect related repetition frequency component will increase, which is shown in FIGS. 7B and 7C, respectively.

A further case study was conducted on the same bearing, however under different radial loads. FIGS. 7D and 7E illustrate the analysis results of the measured vibration signals. For the same rotational speed 1,200 rpm, the same defect-related frequency component at 105 Hz was once again identified, demonstrating the effectiveness of the invented signal processing technique. In addition, the results further illustrated that different resonant modes were excited when the load conditioning was varied. For example, when 4,582 N radial load was applied to the test bearing, the defect-related frequency component was identified at all the scales, shown in FIG. 7E. The same frequency component was identified only at scales 1 to 2.4 under 3,665 N, as shown in FIG. 7A.

Figure 8:
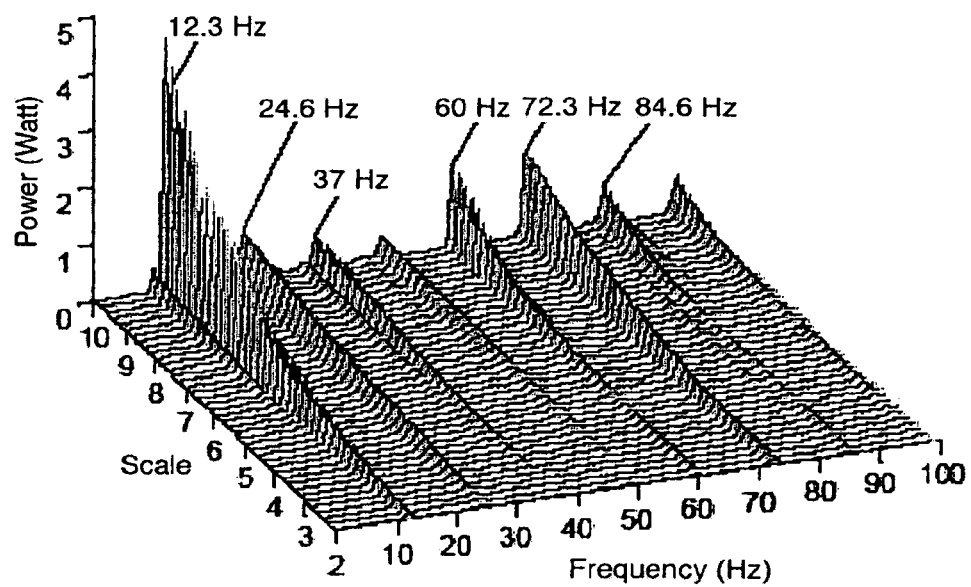
FIG. 8 is an exemplary output display showing the effectiveness of the present invention in detecting a structural defect on the inner raceway of a ball bearing.

The effectiveness of the multi-scale enveloping spectrogram technique of the present invention was further confirmed by another case study, where a structural defect was located in the inner raceway of a ball bearing. A radial load of 10 kN was applied, and the bearing rotational speed was 740 rpm. The wavelet decomposition scales were chosen from 2 to 10, with an increment of 0.2. This covers the frequency range of 500-2,500 Hz. The analysis result is shown in FIG. 8. It is seen that, in addition to appreciable peaks at the shaft frequency and its harmonics (i.e. 12.3, 24.6, and 37 Hz, respectively, caused by bearing unbalance), three other peaks were identified at 60, 72.3, and 84.6 Hz, respectively. Based on the geometry of the bearing and the shaft rotational speed, the peaks at 72.3 Hz can be traced back to defect related repetition frequency on the inner raceway. This indicated that a structural defect exists on the inner raceway of the ball bearing. The peaks at 60 and 84.6 Hz frequency are attributed to the combined effect of the bearing unbalance and the structural defect, as they are equivalent to 72.3+/−12.3 Hz.

Figure 9:
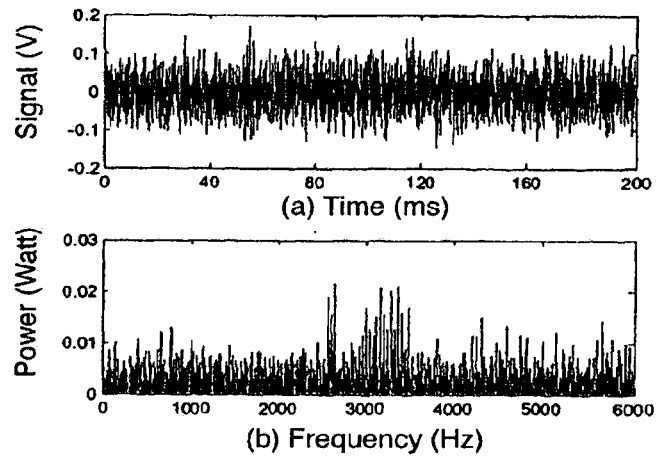
FIG. 9 provides a comparison of effectiveness using conventional Fourier Transform, enveloping analysis and Multi-Scale Enveloping Spectrogram in accordance with the invention.
Figure 9:
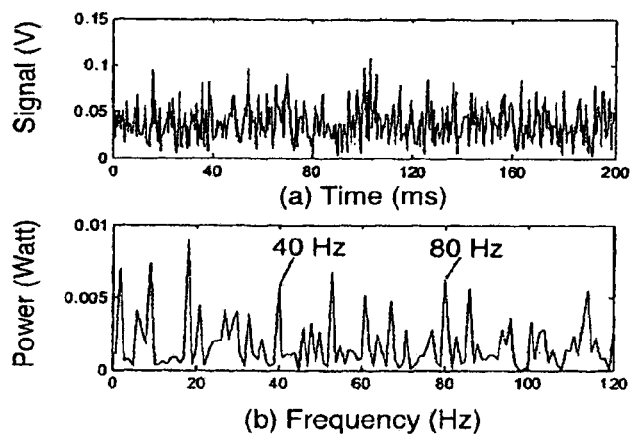
Figure 9:
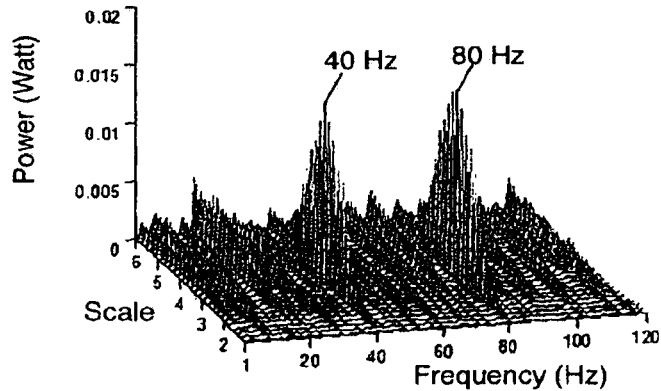

FIG. 9 provides a comparison of effectiveness in bearing defect identification using three techniques: (A) conventional Fourier transform, (B) enveloping analysis, and (C) Multi-Scale Enveloping Spectrogram in accordance with the invention. As can be seen in FIG. 9A, using only conventional Fourier transform analysis, there is no apparent signal pattern that could be identified except for dominant spectral components at a frequency of about 3 kHz. These spectral components are not related to the bearing structural defects. The use of the envelope analysis alone does not provide any apparent signal pattern either, as shown in the upper portion of FIG. 9B. Adding band-pass filtering revealed the existence of two frequency components at 40 Hz and 80 Hz, respectively, however their relatively weak amplitudes make them difficult to be distinguished from other frequency components. In comparison, these two defect characteristic frequency components are clearly identified at various scales when the signal is analyzed using the Multi-Scale Enveloping Spectrogram procedure in accordance with the invention, as shown in FIG. 9C.

CONCLUSIONS

The present invention provides a wavelet-based Multi-Scale Enveloping Spectrogram technique, which enables a multi-domain, multi-scale signal decomposition and representation. Experimental study has shown that the Multi-Scale Enveloping Spectrogram technique according to the invention can effectively detect bearing structural defect. In addition to bearing diagnosis, the technique of the present invention is generally applicable to the health diagnosis of rotating machines, such as spindles and gearboxes, where vibrations are caused by periodic structural interactions between the defects and rotating machines, as well as for prognosis of remaining service life in machines. Moreover, the MuSEnS signal processing technique can be used in other fields, such as, but not limited to the health care industry for humans. By integrating the enhanced feature extraction capability of the MuSEnS technique with condition monitoring sensors, such as monitoring sensors for blood pressure, heart beat, or oxygence content measurement, for example, real-time, remote, and portable human health monitoring can be realized.

Although an exemplary embodiment of the present invention has been shown and described with reference to particular embodiments and applications thereof, it will be apparent to those having ordinary skill in the art that a number of changes, modifications, or alterations to the invention as described herein may be made, none of which depart from the spirit or scope of the present invention. All such changes, modifications, and alterations should therefore be seen as being within the scope of the present invention.

What is claimed is:

1. A method of signal processing, said method comprising the steps of:
   (a) obtaining a signal from physical phenomena to monitor operation of an underlying system, wherein the signal is provided from a sensor monitoring a condition of the system, and the signal is indicative of the condition being monitored;
   (b) processing the signal using a continuous wavelet transform at a plurality of different scales;
   (c) extracting signal envelope for the processed signal for each scale;
   (d) applying spectral analysis to the extracted envelopes to determine the frequency compositions thereof;
   (e) generating a three-dimensional frequency map from the determined frequency compositions; and
   (f) displaying the three-dimensional frequency map, whereby the signal provided by the sensor is transformed into a visual presentation that indicates the intensity and location of defect-induced or condition-induced frequencies that are indicative of the condition being monitored.

2. The method of claim 1 wherein the signal to be processed is obtained from a mechanical system.

3. The method of claim 2 wherein the signal to be processed is a vibration signal.

4. The method of claim 1 wherein the signal to be processed is obtained from a physiological signal.

5. The method of claim 1 wherein the continuous wavelet transform employs the complex Morlet wavelet.

6. The method of claim 1 wherein extracting the signal envelope includes determining a root sum square from real and imaginary parts of the processed signal for each scale.

7. The method of claim 1 wherein applying spectral analysis includes using a Fourier transform.

8. The method of claim 1 comprising displaying the three-dimensional frequency map in a plurality of different colors indicating different frequency energy levels.

9. A method of signal processing, said method comprising the steps of:
   (a) obtaining a signal from physical phenomena to monitor operation of an underlying system, wherein the signal is provided from a sensor monitoring a condition of a machine and/or machine component or a condition in a physiological system and the signal is indicative of the condition being monitored;
   (b) processing the signal using a continuous wavelet transform at a plurality of different scales;
   (c) extracting signal envelope for the processed signal for each scale;
   (d) applying spectral analysis to the extracted envelopes to determine the frequency compositions thereof;
   (e) generating a three-dimensional frequency map from the determined frequency compositions; and
   (f) displaying the three-dimensional frequency map, whereby the signal provided by the sensor is transformed into a visual presentation that indicates the intensity and location of defect-induced or condition-induced frequencies that are indicative of the condition being monitored.

10. The method of claim 9 wherein the signal to be processed is obtained from a mechanical system.

11. The method of claim 10 wherein the signal to be processed is a vibration signal.

12. The method of claim 9 wherein the signal to be processed is obtained from a physiological signal.

13. The method of claim 9 wherein the continuous wavelet transform employs the complex Morlet wavelet.

14. The method of claim 9 wherein extracting the signal envelope includes determining a root sum square from real and imaginary parts of the processed signal for each scale.

15. The method of claim 9 wherein applying spectral analysis includes using a Fourier transform.

16. The method of claim 9 wherein displaying the three-dimensional frequency map includes displaying the three-dimensional frequency map in a plurality of different colors indicating different frequency energy levels.

17. A system for processing a signal, said system comprising:
- a sensor for obtaining a signal from physical phenomena to monitor operation of an underlying system, wherein the sensor is monitoring a condition of a machine and/or machine component or a condition in a physiological system, and the signal is indicative of the condition being monitored;
- a processor adapted to receive the signal provided by the sensor,
- an output display coupled to the processor;
- the processor being programmed to:
  - (a) process the signal using a continuous wavelet transform at a plurality of different scales;
  - (b) extract signal envelopes for the processed signal for each scale;
  - (c) apply spectral analysis to the extracted envelopes to determine the frequency compositions thereof;
  - (d) generate a three-dimensional frequency map from the determined frequency compositions; and
  - (e) display the three-dimensional frequency map on the output display, whereby the signal provided by the sensor is transformed into a visual presentation that indicates the intensity and location of defect-induced or condition-induced frequencies that are indicative of the condition being monitored.

18. The system of claim 17 wherein the sensor is a vibration sensor.

19. The system of claim 17 wherein the sensor is a physiological signal sensor.

20. The system of claim 17 wherein the continuous wavelet transform employs the complex Morlet wavelet.

21. The system of claim 17 wherein extracting the signal envelope includes determining a root sum square from real and imaginary parts of the processed signal for each scale.

22. The system of claim 17 wherein applying spectral analysis includes using a Fourier transform.

23. The system of claim 17 wherein the processor is further programmed to generate and display the three-dimensional frequency map in a plurality of different colors indicating different frequency energy levels.

* * * * *